US010306207B2

(12) United States Patent
Matono et al.

(10) Patent No.: US 10,306,207 B2
(45) Date of Patent: May 28, 2019

(54) INFORMATION PROCESSING SYSTEM

(71) Applicant: HITACHI AUTOMOTIVE SYSTEMS, LTD., Ibaraki (JP)

(72) Inventors: Haruki Matono, Tokyo (JP); Toshiyuki Aoki, Tokyo (JP); Yoshiyuki Muto, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 117 days.

(21) Appl. No.: 15/324,414

(22) PCT Filed: Jun. 3, 2015

(86) PCT No.: PCT/JP2015/065970
§ 371 (c)(1),
(2) Date: Jan. 6, 2017

(87) PCT Pub. No.: WO2016/006368
PCT Pub. Date: Jan. 14, 2016

(65) Prior Publication Data
US 2017/0180701 A1    Jun. 22, 2017

(30) Foreign Application Priority Data

Jul. 7, 2014   (JP) .................. 2014-139293

(51) Int. Cl.
*H04N 7/00*     (2011.01)
*H04N 13/204*   (2018.01)
(Continued)

(52) U.S. Cl.
CPC ....... *H04N 13/204* (2018.05); *B60K 31/0008* (2013.01); *B60R 1/00* (2013.01);
(Continued)

(58) Field of Classification Search
USPC .................................. 348/113, 159
See application file for complete search history.

(56) References Cited

U.S. PATENT DOCUMENTS

2003/0171865 A1   9/2003  Moser et al.
2004/0001019 A1*  1/2004  Nakazawa .............. G01S 13/87
                                                    342/70
(Continued)

FOREIGN PATENT DOCUMENTS

EP    2439714 A1    4/2012
JP    1993-053975 A  3/1993
(Continued)

OTHER PUBLICATIONS

Extended European Search Report dated Feb. 2, 2018 for the European Application No. 15819626.1.

*Primary Examiner* — Nigar Chowdhury
(74) *Attorney, Agent, or Firm* — Volpe and Koenig, P.C.

(57) ABSTRACT

To process sensor information positively in an information processor to which plural sensors are connected. An information processing system including plural sensors, plural buses respectively connected to the plural sensors, an arbitration unit performing arbitration of the plural buses and a priority determination unit determining the priority of each of the plural sensors, in which the arbitration unit performs arbitration of the plural buses in accordance with the determination result of the priority determination unit.

10 Claims, 6 Drawing Sheets

(51) Int. Cl.
*B60R 1/00* (2006.01)
*G06F 13/362* (2006.01)
*G08G 1/16* (2006.01)
*G06T 7/70* (2017.01)
*B60T 8/171* (2006.01)
*G06K 9/00* (2006.01)
*G06T 5/40* (2006.01)
*B60K 31/00* (2006.01)
*H04N 7/18* (2006.01)

(52) U.S. Cl.
CPC ............ *B60T 8/171* (2013.01); *G06F 13/362* (2013.01); *G06K 9/00805* (2013.01); *G06T 5/40* (2013.01); *G06T 7/70* (2017.01); *G08G 1/16* (2013.01); *G08G 1/165* (2013.01); *G08G 1/166* (2013.01); *B60R 2300/105* (2013.01); *B60R 2300/107* (2013.01); *B60R 2300/202* (2013.01); *B60R 2300/207* (2013.01); *B60R 2300/802* (2013.01); *B60R 2300/8066* (2013.01); *B60T 2210/32* (2013.01)

(56) References Cited

U.S. PATENT DOCUMENTS

| | | | | |
|---|---|---|---|---|
| 2005/0111701 A1* | 5/2005 | Seki | ................ | G08B 13/19645 382/107 |
| 2005/0143887 A1 | 6/2005 | Kinoshita | | |
| 2006/0271286 A1* | 11/2006 | Rosenberg | ......... | G01C 21/3647 701/431 |
| 2007/0154068 A1* | 7/2007 | Stein | ........................ | G01C 3/22 382/106 |
| 2008/0240506 A1* | 10/2008 | Nakamura | ............. | G01C 11/00 382/104 |
| 2009/0248270 A1* | 10/2009 | Sekiguchi | ............. | B60W 10/06 701/96 |
| 2010/0134325 A1* | 6/2010 | Gomi | ........................ | B60R 1/00 340/995.14 |
| 2011/0234749 A1* | 9/2011 | Alon | .................... | G07C 5/0866 348/36 |
| 2012/0078498 A1* | 3/2012 | Iwasaki | ................. | B60W 10/06 701/300 |
| 2013/0070095 A1* | 3/2013 | Yankun | ............... | G06K 9/00805 348/148 |
| 2013/0250114 A1* | 9/2013 | Lu | ...................... | H04N 5/23238 348/148 |
| 2013/0282238 A1 | 10/2013 | Ricci et al. | | |
| 2014/0015494 A1* | 1/2014 | Kobayashi | ............ | B60L 3/0069 320/137 |
| 2014/0118341 A1* | 5/2014 | Shimizu | ................ | G06T 3/4038 345/419 |
| 2014/0169630 A1* | 6/2014 | Fukata | ................... | G08G 1/167 382/103 |
| 2015/0015673 A1 | 1/2015 | Matono et al. | | |
| 2015/0029012 A1* | 1/2015 | Mitani | ................... | B60Q 9/008 340/436 |
| 2015/0213719 A1* | 7/2015 | Lee | ........................ | G08G 1/167 701/41 |
| 2015/0274062 A1* | 10/2015 | Wen | ...................... | B60K 31/18 348/77 |

FOREIGN PATENT DOCUMENTS

| | | |
|---|---|---|
| JP | 2002-271350 A | 9/2002 |
| JP | 2005-196276 A | 7/2005 |
| JP | 2008-207627 A | 9/2008 |
| JP | 2010-136295 A | 6/2010 |
| JP | 2011-114850 A | 6/2011 |
| WO | 2013/132951 A1 | 9/2013 |

* cited by examiner

| SPEED [km/h] | STATUS | DISPLAY |
|---|---|---|
| LESS THAN 30 | FRONT MONITORING CAMERA OUT OF ORDER | REAR MONITORING CAMERA FIXED |
| 30 OR MORE | FRONT MONITORING CAMERA OUT OF ORDER | NORMAL |

(b)

| SPEED [km/h] | STATUS | DISPLAY |
|---|---|---|
| LESS THAN 30 | NO FAILURE | REAR MONITORING CAMERA FIXED |
| 30 OR MORE | NO FAILURE | FRONT MONITORING CAMERA HAS PRIORITY NORMAL |

INFORMATION PROCESSING SYSTEM

TECHNICAL FIELD

The present invention relates to a system for processing information.

BACKGROUND ART

There is Patent Literature 1 as a background art of the technical field. The patent publication discloses that "to suitably decide a priority order in the case of using a bus between devices and to sufficiently transfer data between devices even when any device is connected to the bus in an information processor connecting plural devices on the same bus. When an existent device 102 and an extended device 105 respectively request the use of a bus 101 to a bus arbitrating means 110 through bus use request signals 103 and 113, the bus arbitrating means 110 selects either the existent device 102 or the extended device 105 and applies the use right of the bus 101 in accordance with the priority order decided by a priority order deciding means 109 based on device information obtained from an existent device information storing means 104 and an extended device information storing means 107 (see Abstract).

CITATION LIST

Patent Literature

Patent Literature 1: JP-A-5-53975

SUMMARY OF INVENTION

Technical Problem

An object is to positively process sensor information in an information processor in which plural sensors are connected. In the related-art technique, information can be transmitted based on information of priority which has been previously decided. However, in the case where plural sensors are connected and the priority changes every moment according to the situation, it was difficult to positively transfer information of a sensor which is actually required.

Solution to Problem

In order to solve the above problems, the summary of simple inventions disclosed in the application is as follows. (1) An information processing system including plural sensors, plural buses respectively connected to the plural sensors, an arbitration unit performing arbitration of the plural buses and a priority determination unit determining the priority of each of the plural sensors, in which the arbitration unit performs arbitration of the plural buses in accordance with the determination result of the priority determination unit.

Advantageous Effects of Invention

In the device to which plural sensors are connected, processing can be performed suitably and positively in real time in accordance with conditions of the sensor such as a dangerous state. Even when part of sensors does not fulfill the performance due to a failure or weather conditions, another sensor can be used by flexibly changing the sensor having the priority according to the sensor state, which improves robustness.

DESCRIPTION OF EMBODIMENTS

Hereinafter, embodiments will be explained with reference to the drawings.

Embodiment 1

In Embodiment 1, an information processing system for processing plural sensor signals will be explained. Recently, a moving object detection device which detects moving objects such as a pedestrian and a vehicle by using plural imaging units (cameras) such as a stereo camera is practically used. Plural cameras including one for monitoring the front direction of the vehicle, one for monitoring the periphery of the vehicle or the rear direction of the vehicle may be provided. Respective functions are described here. The front camera functions as a front monitoring camera for detecting existence of an obstacle or a preceding vehicle existing within about 100 meters and is used also as a sensor having a function of an automatic braking or following the preceding vehicle by measuring the distance and relative speed. The peripheral camera is used as a periphery monitoring sensor for assisting parking when stopping the vehicle. For example, a display is installed at a position where a driver can see video of a camera attached in the rear of the vehicle such as in a car interior, and the video of the rear is displayed on the display. The driver can check a dead angle which is difficult to be seen by eyes by the display. Respective cameras have respective functions as sensors such as the front camera for controlling the vehicle and the camera for assisting the driving, therefore, priorities of processing differ according to the situation when these functions are realized on the same platform. The present invention provides a scheme capable of changing the priority of a communication line such as a bus so that the camera playing the role of control is preferentially processed in such conditions.

Figure 1:
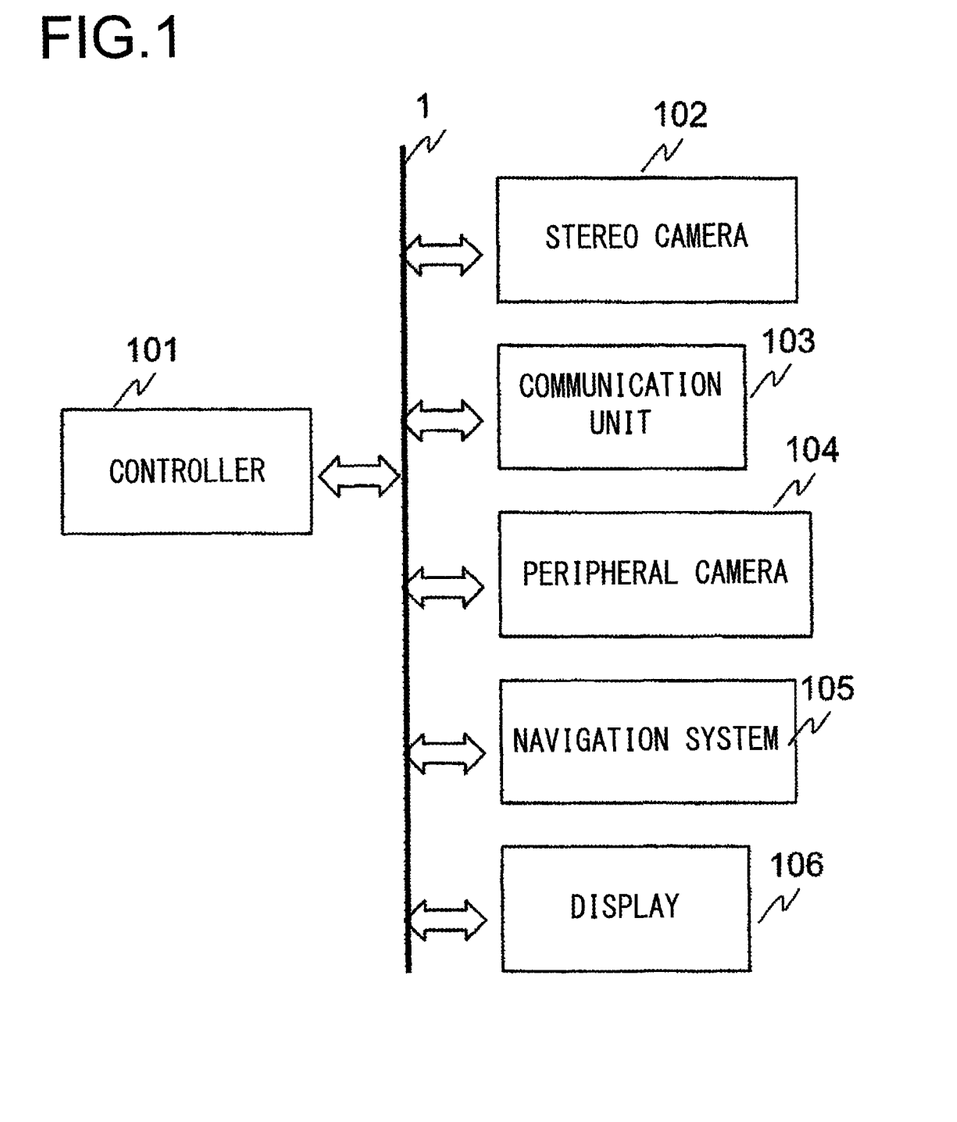
FIG. 1 is a view showing a configuration example of the entire information processing system according to the present invention.

FIG. 1 shows a configuration example of the entire information processing system according to the present invention. The information processing system shown in FIG. 1 is configured by including a controller 101 receiving information from respective sensors and controlling the respective sensors, a stereo camera 102 monitoring the front direction within about 100 meters, a communication unit 103 as a C2X module performing communication between an own vehicle and the other vehicle or communication (C2X (Car to X) communication) between the own vehicle and communication devices installed on a road and so on, a peripheral camera 104 having a function of detecting an obstacle or a moving object by outputting video obtained by imaging the periphery of the own vehicle on a display installed at a position where the video can be seen by a driver and by performing image processing to the inputted video, a navigation system 105 having a function of displaying a current location of the own vehicle on a map by using map information and GPS receiving information to thereby navigate to a destination set by a user and a display 106 displaying video obtained by respective cameras, map information by the navigation system 105, controller information and so on. Respective units from 101 to 106 are mutually connected through a bus 1. Here, the bus 1 is shown as one line in FIG. 1, however, there exist plural lines as described below for performing processing in accordance with priorities of respective modules according to the priority.

Figure 2:
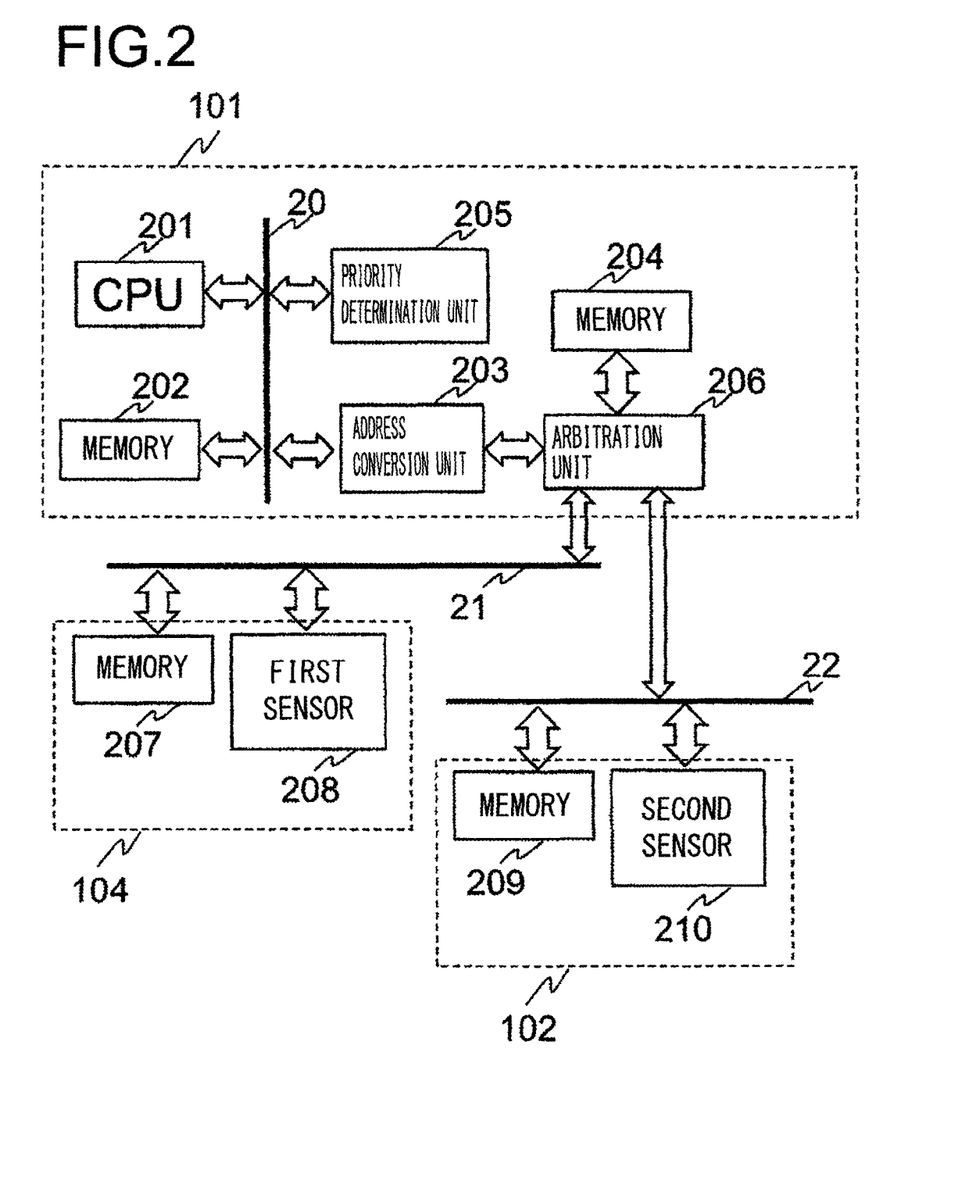
FIG. 2 is a view showing a first configuration example for performing arbitration of respective units in accordance with the priority by using plural buses.

A method of arbitrating the bus priority as a feature of the Embodiment 1 will be specifically shown. FIG. 2 shows a first configuration example for performing arbitration of respective units in accordance with the priority by using plural buses. In this case, the arbitration between the stereo camera 102 and the peripheral camera 104 will be explained as an example.

The controller 101 has a general configuration including a CPU 201, a memory 202, an address conversion unit 203 and a memory 204 which are mutually connected through a bus 20, further including a priority determination unit 205 and an arbitration unit 206. A memory 207 and a first sensor 208 connected to the arbitration unit 206 through a bus 21 correspond to the peripheral camera 104, and a memory 209 and a second sensor 210 connected to the arbitration unit 205 through a bus 22 correspond to the stereo camera 102.

The priority determination unit 205 determines the priority based on information from respective sensors. For example, when receiving information indicating that an obstacle which may collide is detected from the second sensor 209, the priority determination unit 205 determines the former as information with high priority also by referring to information from the first sensor 207. The arbitration unit 206 performs arbitration so that the access is made to the bus which should be preferentially connected. In the above example, the access is made to the bus 22 which should be preferentially connected based on the determination result from the priority determination unit 205 and desired video and so on are read out from the memory 208 to be displayed on the display 106. In this case, for example, priorities are assigned to high-order bit addresses seen from the CPU, and the arbitration unit 206 controls access to the bus in accordance with the priorities.

As described above, plural buses are included, the priority determination unit 205 determines the priority based on information from respective sensors, and the arbitration unit 206 performs arbitration so that the access is made to the optimum bus based on the determination result and reads necessary information appropriately from the memory of the next stage, thereby transmitting suitable sensor information and displaying necessary information to the user in accordance with situation change.

The case where two sensors are included is cited as an example and explained in FIG. 2, however, the present invention is not limited to this. There may be other sensors not shown in FIG. 1 such as a sensor for information concerning other vehicles and roads obtained from the communication unit 103, a vehicle speed monitoring sensor which monitors speed of the own vehicle and a travelling direction monitoring sensor which monitors a travelling direction of the own vehicle, which can be applied in the same manner by providing buses corresponding to respective sensors. Also in the above explanation of the embodiment, the memory 207 and the first sensor 208 correspond to the peripheral camera 104, and the memory 209 and the second sensor 210 connected to the arbitration unit 205 through the bus 22 correspond to the stereo camera 102, however, the present invention is not limited to this and can be applied to a system having some plural sensors. The same applies to other embodiments explained below.

Embodiment 2

Embodiment 2 is an example of an information processing system which can give priority to information of a particular sensor further positively in addition to Embodiment 1. The details will be explained with reference to FIG. 3. Concerning components which are the same as those of Embodiment 1, the components of Embodiment 1 are invoked and description is omitted, and different components will be mainly explained.

Figure 3:
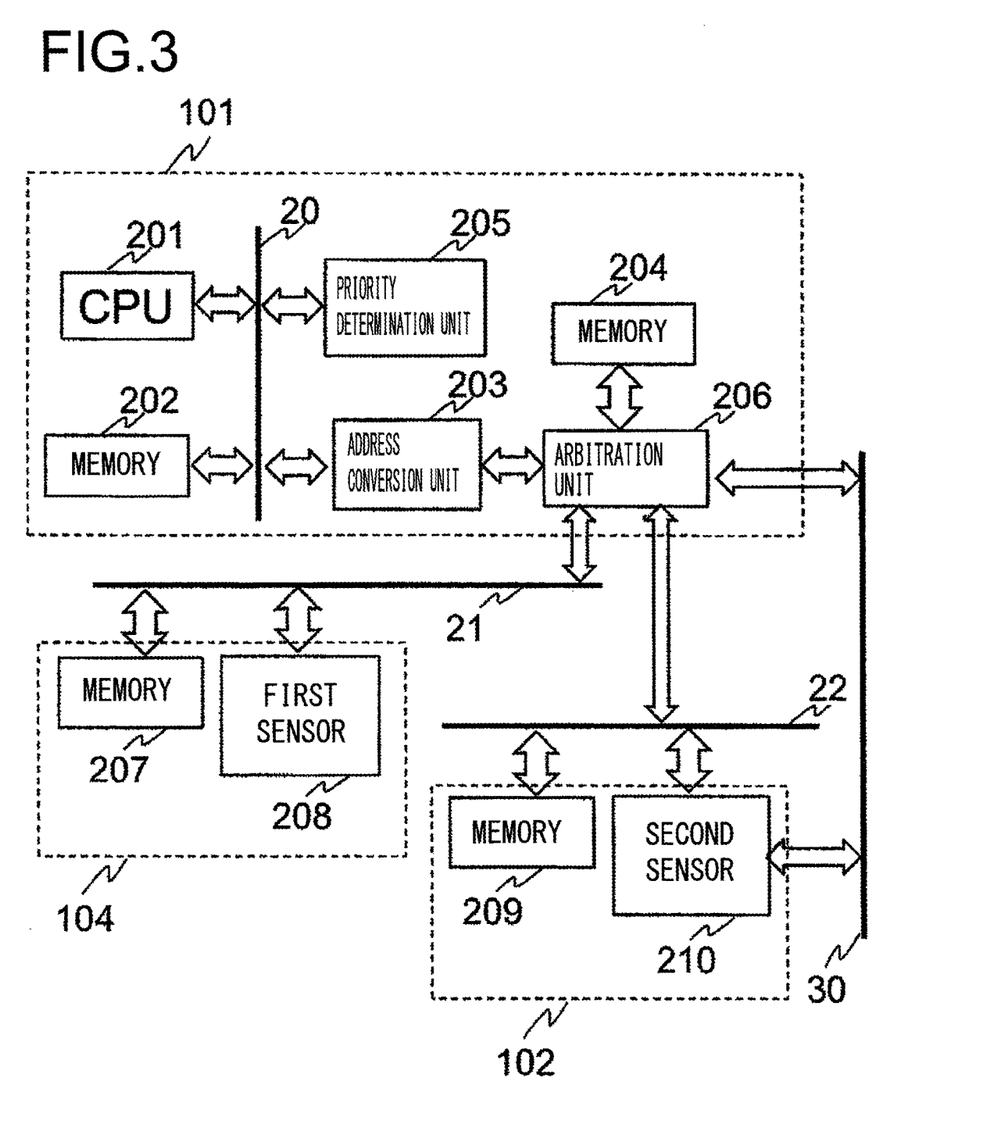
FIG. 3 is a view showing a second configuration example for performing arbitration of respective units in accordance with the priority by using plural buses.

FIG. 3 shows a second configuration example for performing arbitration of respective units in accordance with the priority by using plural buses. A bus 30 is newly provided to the second sensor 210 and the arbitration unit 206 in addition to the components of Embodiment 1. The bus 30 is a dedicated bus not shared with other sensors and not for large capacity data such as image data. The priority is updated by the dedicated bus according to the result from the second sensor 210, thereby changing the priority without delay, positively transmitting and controlling information of the sensor which is particularly important as the sensor for detecting the existence of an obstacle in front of the own vehicle or a preceding vehicle without being interrupted by processing of other sensors just before the vehicle collides an obstacle. Though the example in which the dedicated bus 30 is provided with respect to the second sensor 210 and the arbitration unit 206 is shown here, the present invention is not limited to this and can be appropriately applied to sensors determined to be highly important in advance.

Embodiment 3

Embodiment 3 is an example of an information processing system including a diagnostic unit for determining whether the sensor can correctly operate due to failure or environment or not, in which, when it is determined that the sensor does not correctly operate, another sensor is allowed to preferentially operate to thereby improve the robustness of the entire system. The system will be explained with reference to FIG. 4. Concerning components which are the same as those of Embodiment 1 and 2, the components of Embodiment 1 and 2 are appropriately invoked and description is omitted, and different components will be mainly explained.

Figure 4:
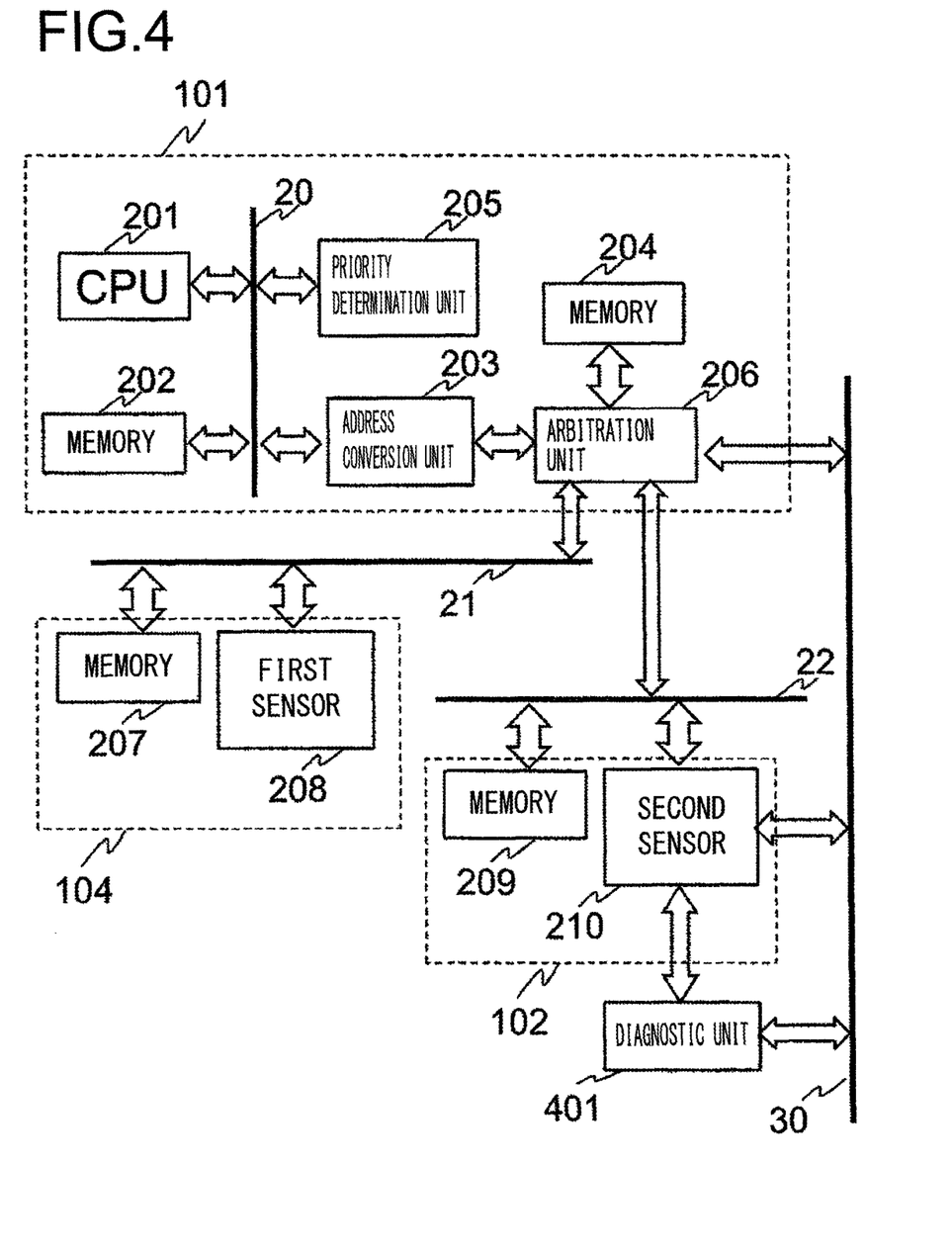
FIG. 4 is a view showing a third configuration example for performing arbitration of respective units in accordance with the priority by using plural buses.

FIG. 4 shows a third configuration example for performing arbitration of respective units in accordance with the priority by using plural buses. A diagnostic unit 401 is newly added to the components of Embodiment 2, and the diagnostic unit 401 is connected to the second sensor 210 and the bus 30. When the diagnostic unit 401 detects an abnormality of the second sensor 210, the diagnostic unit 401 notifies the arbitration unit 206 of the abnormality of sensor processing.

The arbitration unit 206 rejects a priority request from the second sensor 210 and gives preference to another sensor. According to the process, another sensor can substitute for part of functions, for example, when the sensor is out of order, therefore, the reliability of the entire system is improved.

In the case where an abnormality of the sensor is detected by the diagnostic unit 401, the user may be informed of the abnormality by display on the display 106 or voice from a not-shown voice output unit, and abnormality information may be transmitted to the outside by the communication unit 103. Though the example in which the diagnostic unit 401 is connected to the second sensor 2 is shown in the Embodiment, the present invention is not limited to this. The diagnostic units may be appropriately used for other sensors respectively as well as one diagnostic unit may be connected with respect to plural sensors.

Embodiment 4

Embodiment 4 is a more specific example of an information processing system using the stereo camera, in which the bus priority is determined by an instruction from a function unit of the stereo camera which makes collision determination, thereby changing the priority efficiently by a small number of circuits.

Figure 5:
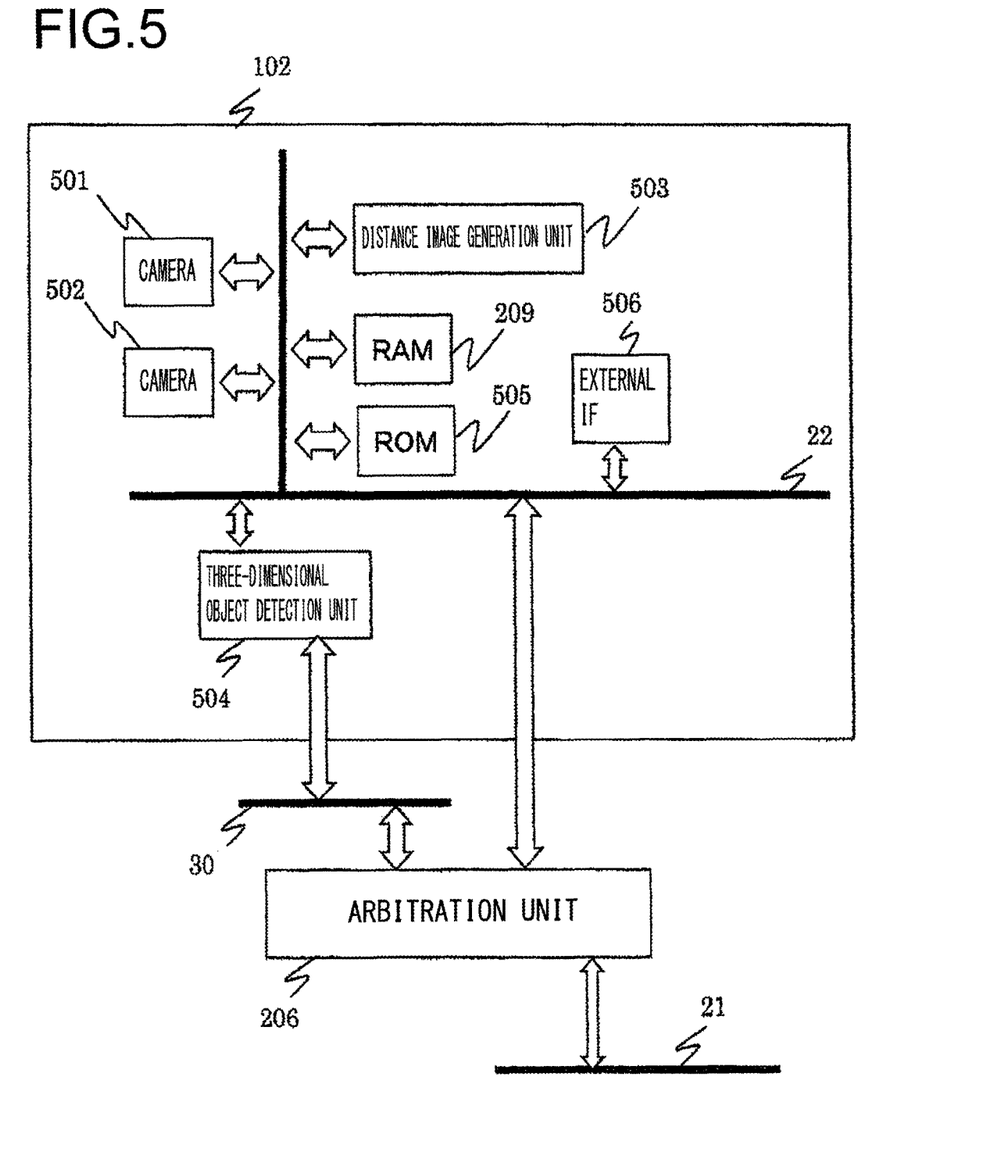
FIG. 5 is a view showing the detailed configuration of a stereo camera and the correspondence between the stereo camera and an arbitration unit.

FIG. 5 shows a configuration example mainly showing the detailed configuration of the stereo camera 102 and the correspondence between the stereo camera 102 and the arbitration unit 206. The stereo camera 102 can calculate positional aberration (parallax) of the same object (three-dimensional object) such as a pedestrian on plural images imaged at the same time by template matching and can measure a distance of the object (three-dimensional object) based on the calculated parallax, which includes a camera 501 as a first imaging unit and a camera 502 as a second imaging unit to obtain plural images. The stereo camera 102 is further configured by appropriately including a distance image generation unit 503 which generates a distance image by using images outputted from the camera 501 and the camera 502, a three-dimensional object detection unit 504 which detects a three-dimensional object based on the generated distance image and making collision determination based on the position, distance and so on, a RAM 209 which is a temporary storage area, a ROM 505 which stores programs and various initial values and an external IF 506 which is a communication means for notifying a control system such as a brake or the user of the recognition state of the camera.

Here, the three-dimensional object detection unit 504 detects a position of the three-dimensional object or a distance from the own vehicle by generating a histogram of, for example, distances in the vertical direction with respect to a road of the generated distance image and by calculating a peak value thereof, which makes collision determination based on the distance between the detected three-dimensional object (obstacle) and the own vehicle.

As the collision determination result is particularly important information in the system, the bus 30 is provided between the three-dimensional object detection unit 504 and the arbitration unit 206 for changing the priority more efficiently, thereby receiving information indicating that the distance with respect to the obstacle is close immediately by the three-dimensional object detection unit 504 through the bus 30. In this case, the arbitration unit 206 can perform arbitration so as to give priority to the bus of the stereo camera 102 by changing the bus priority by the not-shown priority determination unit.

Although the case of the stereo camera is explained as an example in the embodiment, the present invention is not limited to this. For example, when using a monocular camera, an image processing unit for determining collision with respect to the obstacle by a known method is arranged instead of the three-dimensional object detection unit 504 in the components to configure the system.

Embodiment 5

Figure 6:
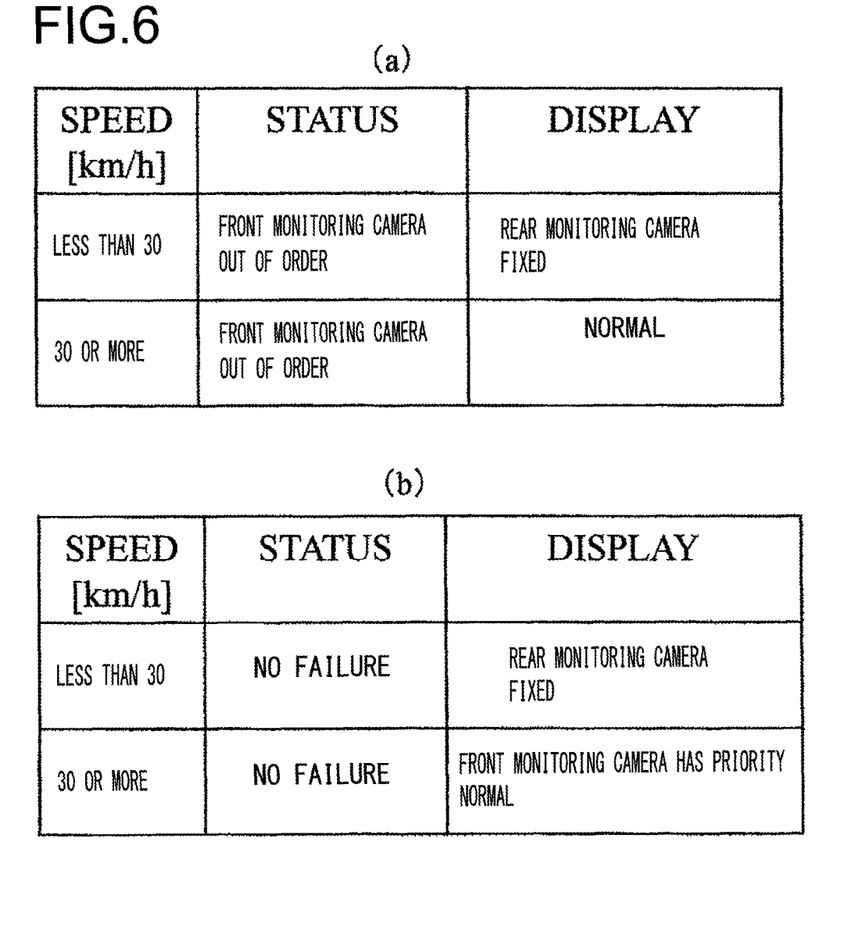
FIG. 6 is a view showing an example in which bus priority is changed in accordance with environment of an own vehicle and peripheral environment.

Embodiment 5 is an example in which the priority is flexibly changed by environment of the own vehicle or peripheral environment. FIG. 6 shows an example of the above. In FIG. 6(a), in the case where the vehicle speed is less than 30 km/h and the front monitoring camera is out of order, the peripheral monitoring camera is fixed in a state of having the priority and video from the peripheral monitoring camera is displayed on the display, and in the case where the vehicle speed is 30 km/h or more and the front monitoring camera is out of order, display is performed on the display while appropriately changing the priority based on information from various sensors other than the front monitoring camera. The priority is fixed or changed appropriately according to the vehicle speed or failure information as described above, thereby switching of display which is highly convenient for the user.

The case where the front monitoring camera is out of order is described as an example, however, the present invention is not limited to this. In the case where there is no broken sensor, it is also preferable that the peripheral camera is fixed in the state of having priority and video from the peripheral monitoring camera is displayed when the vehicle speed is less than 30 km/h, and that the priority is not fixed and appropriately changed while giving priority to the front monitoring camera when the vehicle speed is 30 km/h or more as shown in FIG. 6 (b). The initial setting corresponding to not only environment of the own vehicle such as the vehicle speed but also peripheral environment may be performed. For example, when information including road conditions around the own vehicle is received from the communication means 103, the fixing of the bus and so on to be preferentially accessed may be switched in accordance with the information. For example, when information indicating that there is a falling object on the road to travel is received, the front monitoring camera capturing a direction where the obstacle which may collide exists can be fixed in the state of having priority.

The present invention is not limited to the above embodiments and includes various modification examples. For example, the above embodiments have been explained in detail for making the present invention easy to understand, and are not always limited to embodiments having all components explained above. It is possible to perform addition, deletion and replacement of other components with respect to part of components of embodiments. It is also possible to suitably combine respective embodiments in a scope of the gist of the invention.

Moreover, part or all of the above respective components, functions, processing units, processing means and so on may be realized by hardware, for example, by designing them as an integrated circuit. The above respective components, functions and so on may also be realized by software by a processor interpreting and executing a program for realizing respective functions. Information of programs, tables, files and so on for realizing respective functions can be stored in memories such as a flash memory or storages such as a memory card.

Furthermore, control lines and information lines which are considered to be necessary are shown for convenience of explanation, and all control lines and information lines in products are not always shown. It may be considered that almost all components are mutually connected in actual fact.

REFERENCE SIGNS LIST 1 bus
101 controller
102 stereo camera
103 communication unit
104 communication camera
105 navigation system
106 display

The invention claimed is:

1. An information processing system comprising:
   plural sensors;
   plural buses respectively connected to the plural sensors;
   an arbitration unit performing arbitration of the plural buses; and
   a priority determination unit determining the priority of each of the plural sensors; and
   a dedicated bus separate from the plural buses, the dedicated bus connected exclusively to one sensor of the plural sensors and the arbitration unit,
   wherein the arbitration unit performs arbitration of the plural buses in accordance with the determination result of the priority determination unit, and
   wherein the one sensor transmits information over the dedicated bus to the arbitration unit for immediate priority updating without interruption from processing from any other sensor of the plural sensors.

2. The information processing system according to claim 1, further comprising:
   a diagnostic unit diagnosing the presence of an abnormality in the sensors,
   wherein the arbitration unit gives priority to a sensor other than the sensor diagnosed as having abnormality by the diagnostic unit.

3. The information processing system according to claim 1,
   wherein at least a front monitoring sensor which monitors a front direction of an own vehicle and a periphery monitoring sensor which monitors the periphery of the own vehicle are included as the plural sensors.

4. The information processing system according to claim 3,
   wherein the arbitration unit performs arbitration so that a bus to which the front monitoring sensor is connected has priority when the own vehicle travels at a predetermined vehicle speed or more, and
   the arbitration unit performs arbitration so that a bus to which the periphery monitoring sensor is connected has priority when the own vehicle travels at less than the predetermined speed.

5. The information processing system according to claim 4,
   wherein, when the diagnostic unit diagnoses that an abnormality exists in the front monitoring sensor, the arbitration unit performs arbitration so that the bus to which the periphery monitoring sensor is connected has priority regardless of the vehicle speed.

6. The information processing system according to claim 1, further comprising:
   a communication means for receiving information including road conditions around the own vehicle,
   wherein the priority determination unit determines so that a bus of a sensor capturing a direction of an obstacle which may collide on a road to travel has priority in the plural sensors based on information received by the communication means, and
   the arbitration unit performs arbitration so that the bus of the sensor determined to have priority by the priority determination unit is preferentially accessed.

7. The information processing system according to claim 3,
   wherein the front monitoring sensor is a monocular camera,
   the information processing system further includes an image processing unit capable of processing an image from the monocular camera and detecting an obstacle to thereby measure a distance between the obstacle and the own vehicle, and
   when it is determined that the distance with respect to the obstacle is close based on the measurement result by the image processing unit, the arbitration unit performs arbitration so that a bus of a memory storing image data of the monocular camera and the detection result of the obstacle has priority.

8. The information processing system according to claim 7, further comprising:
   a display unit displaying video,
   wherein, when it is determined that the distance with respect to the obstacle is close based on the measurement result by the image processing unit, image data of the monocular camera is read from the memory of the bus arbitrated to have priority by the arbitration unit and displayed on the display unit.

9. The information processing system according to claim 3,
   wherein the front monitoring sensor is a stereo camera, and the information processing system further includes
   a distance image generation unit which generates distances of respective pixels from right and left images acquired by the stereo camera, and
   a histogram peak detection processing unit which generates a histogram of distances in a vertical direction with respect to a road of the distance image generated by the distance image generation unit and calculates a peak value thereof, and
   when the histogram peak detection result by the histogram peak detection processing unit has a peak of a close distance with respect to the road to travel of the own vehicle, the arbitration unit performs arbitration so that the bus of the memory storing the image data and the distance image of the stereo camera has priority.

10. The information processing system according claim 9, further comprising:
   a display unit displaying video,
   wherein, when it is determined that the distance with respect to the obstacle is close based on the measurement result by the image processing unit, image data of the stereo camera is read from the memory of the bus arbitrated to have priority by the arbitration unit and displayed on the display unit.

* * * * *